UNITED STATES PATENT OFFICE.

CHARLES GLASER, OF BALTIMORE, MARYLAND.

METHOD OF SEPARATING CALCIUM FROM MAGNESIUM CONTAINED IN SALINE SOLUTIONS.

1,242,434.  Specification of Letters Patent.  Patented Oct. 9, 1917.

No Drawing.  Application filed October 8, 1914. Serial No. 865,742.

*To all whom it may concern:*

Be it known that I, CHARLES GLASER, a citizen of the United States, and resident of Baltimore, in the State of Maryland, have invented certain new and useful Improvements in Methods of Separating Calcium from Magnesium Contained in Saline Solutions, of which the following is a specification.

The present invention constitutes a further improvement upon the process described in U. S. Patents No. 957,416 and No. 957,417 both of May 10, 1910 and Reissue Patent No. 13268 of July 11, 1911 and resides in a method of separating calcium from magnesium contained in saline solutions.

The present method has been considerably simplified and is carried out in the following manner:

The brine or other saline solution, containing calcium and magnesium salts preferably as chlorids, is heated to a temperature of not higher than 60° C., and enough of a solution of sodium carbonate is added to convert all calcium and magnesium salts into carbonates. At and below the temperature stated, however, only calcium will be precipitated as carbonate. After removal of this precipitate, preferably by drawing the clear supernatant solution into another vessel, the temperature of the solution is increased to about 72° C., when the magnesia will commence to separate out. The heating is continued and, when a temperature of 85° C. is reached, it will be found, that the largest part of the magnesia has separated out. As a matter of practical safety, it is advisable, however, to continue heating until the temperature of the boiling point is reached, at which the liquid is kept for a short time.

The removal of magnesia is so complete, that its presence can no longer be proven by ordinary analytical methods.

The improved method here described is of very great practical importance, as no observations are necessary to find the instant when enough sodium carbonate solution has been added to precipitate only the calcium and not the magnesia. This is done automatically, as at the stated temperature magnesium carbonate is quite soluble in brines. The entire sodium carbonate solution may therefore be added in one operation, which makes a great saving of time for the workmen and leaves nothing to their judgment. When the magnesia content in the brine is very low, less than 0.04% for instance, it sometimes happens, that upon heating the brine to higher temperature, magnesium carbonate does not completely, or not at all precipitate, unless a restricted quantity of alkali, such as sodium hydroxid solution, is added to favor the formation of a basic magnesium carbonate.

Below is given one example of how this method may be carried out:

Supposing the brine used, originally contained 1825 pounds of calcium oxid and 226.8 pounds magnesia in 300 tons of the liquid. Of the calcium oxid present 167 pounds have been previously removed in the discard as carbonate, leaving 3095.5 pounds of calcium carbonate to be recovered. 300 tons, equal to 62500 gallons of this brine, previously treated for the separation of the discard and sulfate-ions, as described in the above cited patents, is now placed in a tank and heated, if necessary, to a suitable temperature under continuous stirring, whereupon 4298 gallons 10% soda solution is added. Of this sodium carbonate solution the calcium requires 3615 gallons, while the magnesia only requires 683 gallons. There is thus obtained nearly 3090 pounds calcium carbonate, containing only a faint trace of magnesia. When the precipitate has settled, the clear liquid is removed to another tank and heated to a temperature of from 70° to 103° C., preferably after adding 30 to 60 gallons of a 20% caustic soda solution, when all of the magnesia is precipitated as a carbonate somewhat basic in character. Its weight will therefore be a little less than the expected weight of the normal salt, usually about 300 pounds.

I claim:—

1. A method of separating calcium from saline solutions, containing calcium and magnesium, consisting in adding to the said solution, a quantity of sodium carbonate solution sufficient to change the calcium salts and the magnesium salts into carbonates, and maintaining the liquid at a temperature not exceeding 60° C., thus causing only the calcium carbonate to precipitate.

2. A method for separating calcium and magnesium from a saline solution, containing calcium and magnesium consisting in adding to said solution, a quantity of sodium carbonate sufficient to change both the calcium salts and the magnesium salts into carbonates, agitating the liquid for a sufficient time to secure homogeneity and allowing it to rest, until the calcium carbonate is precipitated as an amorphous powder; and thereafter heating the separated supernatant solution to a temperature ranging from 70° to 103° C. and causing the magnesium to precipitate as a carbonate.

3. A method of separating calcium and magnesium from a saline solution containing calcium and magnesium, consisting in adding to said solution, a quantity of sodium carbonate solution sufficient to change both the calcium salts and the magnesium salts into carbonates, maintaining the liquid at a temperature not exceeding 60° C., until the calcium carbonate precipitates, then separating such precipitate from the remaining liquid; and thereafter heating the remaining liquid to a temperature ranging from 70° to 103° C., and causing the magnesium to precipitate as a carbonate.

4. A method of separating calcium and magnesium from saline solutions, containing calcium and magnesium, which consists in adding to such solution a quantity of sodium carbonate solution sufficient to change the calcium salts and the magnesium salts into carbonates, then bringing the liquid to a temperature not over 60° C., and so maintaining it until the calcium precipitates as carbonate; then adding caustic soda to the remaining liquid and raising the temperature thereof to from 70° to 103° C., and so maintaining it until the magnesium is precipitated as a slightly basic carbonate.

5. A method of separating calcium and magnesium from saline solutions, containing calcium and magnesium, consisting in adding to such a solution, while at a moderate temperature not exceeding 60° C., a quantity of sodium carbonate solution sufficient to change the calcium salts and the magnesium salts both into carbonates, maintaining the liquid at such temperature until the calcium carbonate has precipitated; then adding a small quantity of caustic soda to the remaining liquid and heating it to a temperature at which the magnesium carbonate coagulates and thereby causing the magnesium to precipitate as a slightly basic carbonate.

6. The art of recovering magnesium from saline solutions containing both calcium and magnesium which consists in mixing with such a solution sufficient of a soluble carbonate to convert both the calcium and magnesium into carbonates establishing a temperature at which the converted calcium precipitates, separating the remaining solution with its converted magnesium and thereafter raising the temperature to that at which the converted magnesium precipitates, and then separating the precipitated magnesium carbonate.

The foregoing specification signed at Baltimore, Md., this fifteenth day of September, 1914.

CHARLES GLASER.

In presence of two witnesses:
GEO. J. KARL,
R. STANLEY CARSWELL.